Feb. 20, 1968   M. W. MARTIN, JR., ETAL   3,369,272
APPARATUS FOR CONCURRENTLY BLOW MOLDING AND
TRIMMING PLASTIC ARTICLES
Filed July 9, 1965   3 Sheets-Sheet 1

INVENTORS
MERRITT W. MARTIN, JR.
JAMES H. MANOR

BY *Olsen and Stephenson*
ATTORNEYS

INVENTORS
MERRITT W. MARTIN, JR.
JAMES H. MANOR

INVENTORS
MERRITT W. MARTIN, JR.
JAMES H. MANOR

BY *Olsen and Stephenson*
ATTORNEYS

# United States Patent Office 3,369,272
Patented Feb. 20, 1968

3,369,272
APPARATUS FOR CONCURRENTLY BLOW MOLD-
ING AND TRIMMING PLASTIC ARTICLES
Merritt W. Martin, Jr., Saline, and James H. Manor,
Milan, Mich., assignors to Hoover Ball and Bear-
ing Company, Saline, Mich., a corporation of
Michigan
Filed July 9, 1965, Ser. No. 470,726
9 Claims. (Cl. 18—5)

ABSTRACT OF THE DISCLOSURE

Blow molding apparatus for forming an organic plastic bottle in a partible mold and concurrently trimming excess material from the neck of the formed bottle before opening the partible mold, including an extruder head for extruding a depending plastic tubing around a blow pin extending vertically through the extruder head. The blow pin has an enlarged head portion and is axially reciprocable, and in its lowermost position is located so that the enlarged head portion is within the cavity of the partible mold when the latter is closed about the extruded tubing. Immediately above the portion of the mold defining the neck of the bottle is an edge for cooperating with the enlarged head portion when the blow pin is retracted from the closed mold, for severing the upper portion of the tubing exterior of the cavity from the blown bottle while the latter is still in the mold.

---

This invention relates generally to apparatus for blow molding plastic containers, such as bottles, and more particularly to blow molding apparatus which includes means for neck trimming the blow molded articles immediately following molding thereof.

In many cases the blow molding of plastic articles involves the formation of a certain amount of excess plastic material, usually referred to as "flash," at the neck end of the bottle. In such cases, it has been more or less conventional practice to neck trim the neck end of the bottle following the molding thereof, by utilizing trimming apparatus especially designed for this purpose. It can be appreciated that this necessity for handling the bottles and moving them from the blow molding machines through the neck trimming apparatus is not only time consuming but costly, and involves special neck trimming apparatus which must be constantly maintained. For many reasons, therefore, it is desirable to neck trim the plastic articles directly in the blow molding apparatus so that as the bottles leave the blow molding machine, the necks thereof are fully trimmed and there is no necessity for the additional neck trimming apparatus.

It is an object of this invention, therefore, to provide, in blow molding apparatus, structure providing for automatic neck trimming of the molded articles prior to their release from the molds.

A further object of this invention is to provide in blow molding apparatus a vertically movable blow pin, operable to supply air to the parison which is expanded into conformity with the mold cavity, to form the container, having a stepped head that in one moved position of the blow pin closes the upper end of the parison, during expansion thereof, and during movement to another position operates to cleanly sever the parison at the neck of the blown container.

The apparatus of this invention includes a die head which is operable to form a downwardly extending hollow parison, a blow pin which extends downwardly through the die head and is operable to supply expansion fluid to the interior of the parison so as to expand it into conformity with a surrounding mold cavity, and an enlarged head on the lower end of the blow pin which is of a shape particularly adapted to the shape of the neck end of the container formed in the mold cavity. The blow pin head is stepped so that it has two portions of different diameters which form a shoulder at their juncture. The blow pin is also movable vertically with respect to both the die head and the mold cavity so that in one position of the blow pin, hereinafter referred to as the "blow position," the smaller diameter portion of the blow pin head is located in a predetermined position in the neck portion of the mold cavity in which it plugs the upper end of the neck during a supply of blowing fluid to the parison, so as to prevent escape of blowing fluid through the neck of the container. During movement of the head upwardly to a second position, the shoulder moves past a shearing edge on the upper end of the mold cavity so as to shear the parison at this point and accomplish a final trimming of the molded container neck.

Further objects, features and advantages of this invention will become apparent from a consideration of the following description, the appended claims, and the accompanying drawing in which:

Figure 1:
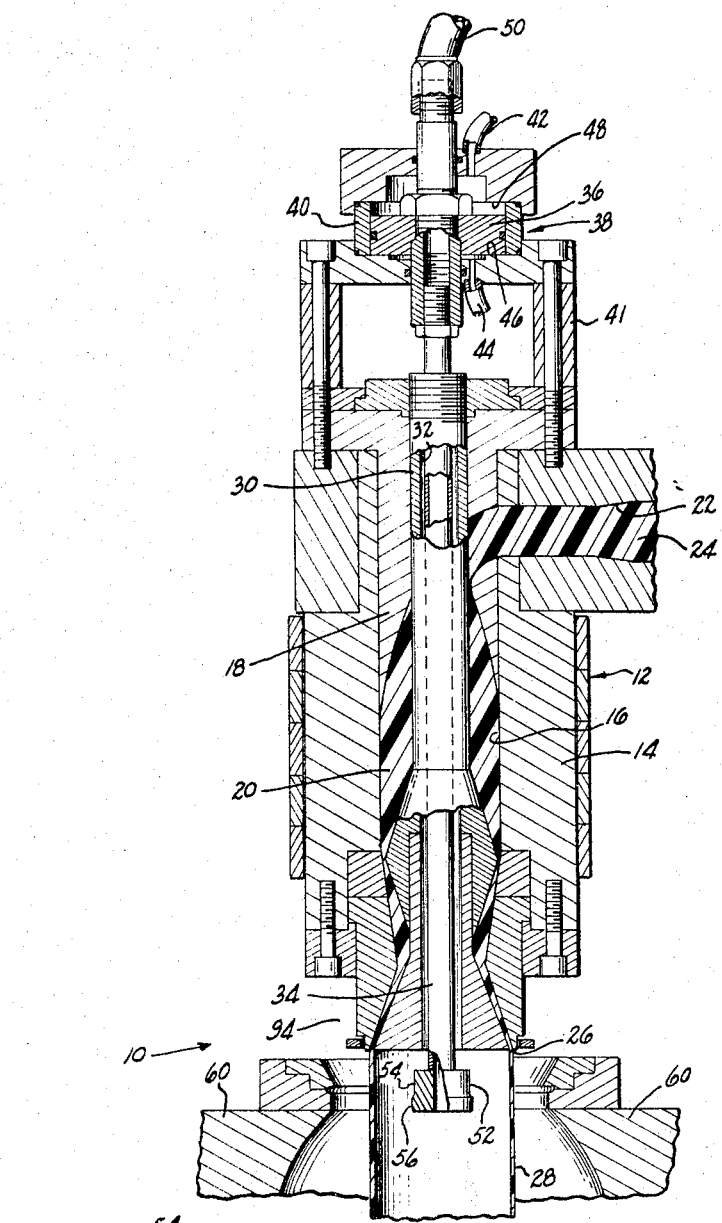
FIGURE 1 is a vertical sectional view of the apparatus of this invention showing the apparatus in position for initially forming a parison.

With reference to the drawing, the apparatus of this invention, indicated generally at 10, is illustrated in FIG. 1 as including an upright die head 12 which consists of a body 14 formed with an axial opening 16 and having a vertically extending mandrel 18 positioned in the opening 16 so as to form therewith an annular passage 20 in the die head 12. The passage 20 communicates at its upper end with a lateral supply passage 22 which is connected to any suitable extruder equipment (not shown) such as is illustrated in patent application Ser. No. 404,759, filed Oct. 19, 1964, now Patent No. 3,335,457, and owned by the assignee of this application, capable of forcing heated plastic 24 in a semi-fluid condition, at timed intervals, through the passage 22. The passage 20 terminates at its lower end in an annular discharge orifice 26 so that when heated plastic in a semi-fluid condition is forced downwardly through the passage 20 and out the orifice 26, a downwardly extending tubular parison 28, of expandible plastic, is formed.

An upright tubular member 30 extends vertically through the mandrel 18 and has an inner wall 32. An elongated blow pin 34 extends vertically through the tubular member 30 in a clearance relation with the inner wall and is attached at its upper end to the piston 36 in a piston and cylinder assembly 38. The assembly 38 is mounted on a frame 41 secured to the upper end of the die head 12 at a position such that the blow pin 34 is substantially axially aligned with the die head discharge orifice 26. The assembly 38 includes a cylinder 40, in which the piston 36 is mounted for up and down movement, and the cylinder 40 is provided at its upper and lower ends with fluid inlet and outlet lines 42 and 44, respectively. As a result, the piston 36 is operable to move the blow pin 34 up and down between a lower position, illustrated in FIGS. 1 and 2 and an upper position illustrated in FIGS. 3 and 4. The piston 36 is shown in FIG. 1 in its lower position in which it is engaged with the cylinder bottom wall 46, and to move the blow pin 34 upwardly to its upper position, fluid is supplied to the cylinder 40 through the line 44 so as to move the piston 36 against the cylinder upper wall 48. To return the piston 36 to its lower position fluid is supplied to line 42.

Figure 7:
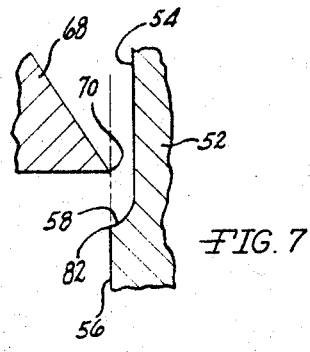
FIGURE 7 is a fragmentary enlarged view illustrating the relationship of the shearing edges on the mold cavity top wall and the blow pin head.

The blow pin 34 is hollow, so that it is of substantially tubular shape, and is connected at its upper end to a flexible conduit 50 which is connected to a suitable supply of fluid, such as air, under pressure. At its lower end, the blow pin 34 is provided with an enlarged head 52 which is of a "stepped" construction. By "stepped" construction is meant that the head 52 has an upper portion 54 and a lower portion 56 which is of a larger diameter than the upper portion 54. The head 52 is of substantially cylindrical wall construction and is formed with a shoulder 58 at the juncture of the portions 54 and 56. As shown in FIG. 7, the shoulder 58 is curved between the head portions 54 and 56, for a purpose to appear presently.

Figure 3:
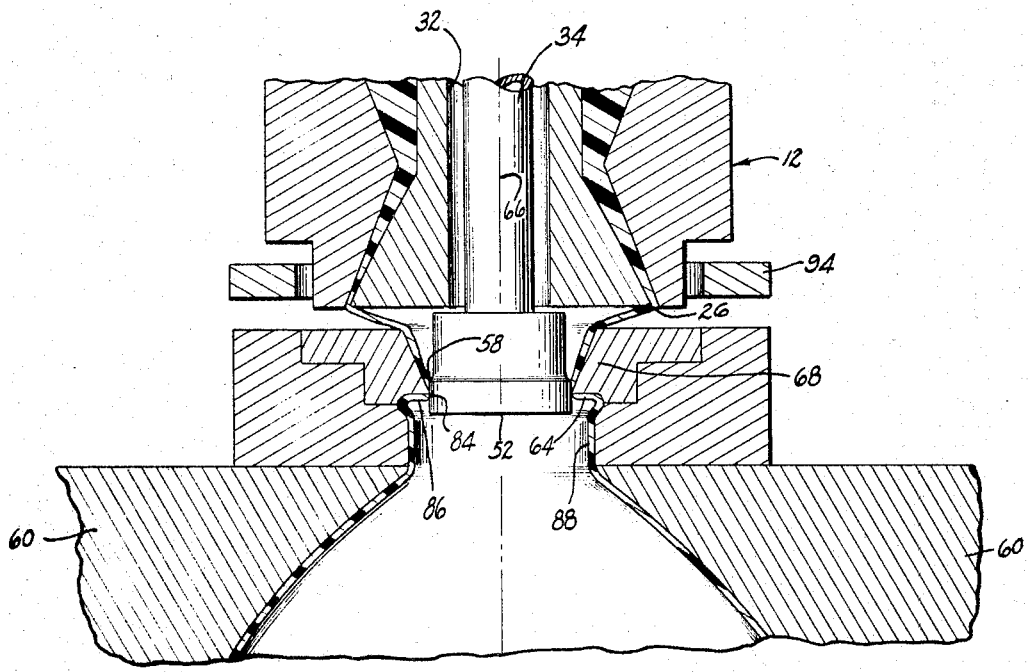
FIGURE 3 is a fragmentary sectional view, illustrated similarly to FIG. 2, showing the blow pin in a retracted position relative to the position shown in FIG. 2, to accomplish neck trimming of the article immediately following blowing thereof.
Figure 4:
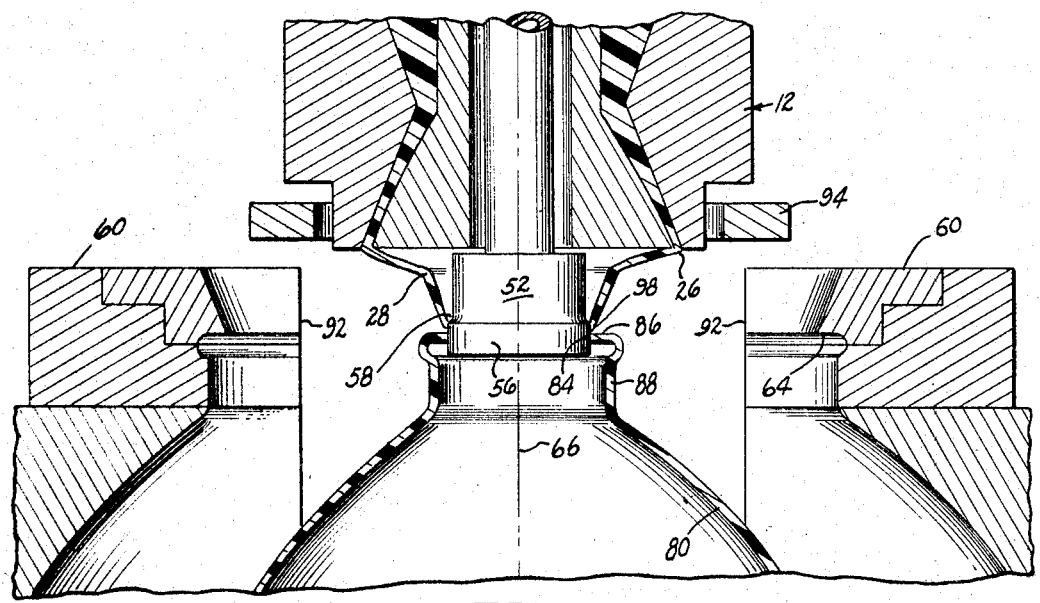
FIGURE 4 is a fragmentary sectional view, illustrated similarly to FIGS. 2 and 3, showing the blown and neck trimmed article suspended from the die head and maintained in a centered position thereon by the blow pin head, during movement of the mold sections away from the blown plastic container.

As shown in FIG. 4, a pair of mold sections 60 are positioned below the die head 12 so as to be in close proximity to the discharge orifice 26. The mold sections 60 are mounted for horizontal movement between their spaced-apart positions shown in FIGS. 1 and 4 and engaged positions shown in FIGS. 2 and 3 in which the mold sections 60 define a mold cavity 62 of a shape corresponding to the desired shape of the plastic bottle to be formed in the apparatus 10. Any suitable apparatus, such as that illustrated in the above-identified copending application, can be used for moving the mold sections 60 between the mold open position shown in FIGS. 1 and 4 and the mold closed position shown in FIGS. 2 and 3. The mold cavity 62 is shaped so that it has a top wall 64 which is of an annular shape and extends generally transversely of the axis 66 of the blow pin 34 and the discharge orifice 26. The portions 68 of the mold sections 60 above the mold top wall 64 are sloped radially outwardly and upwardly so as to form an annular shearing edge 70 (FIG. 7) at the radially inner edge of the mold top wall 64.

Figure 2:
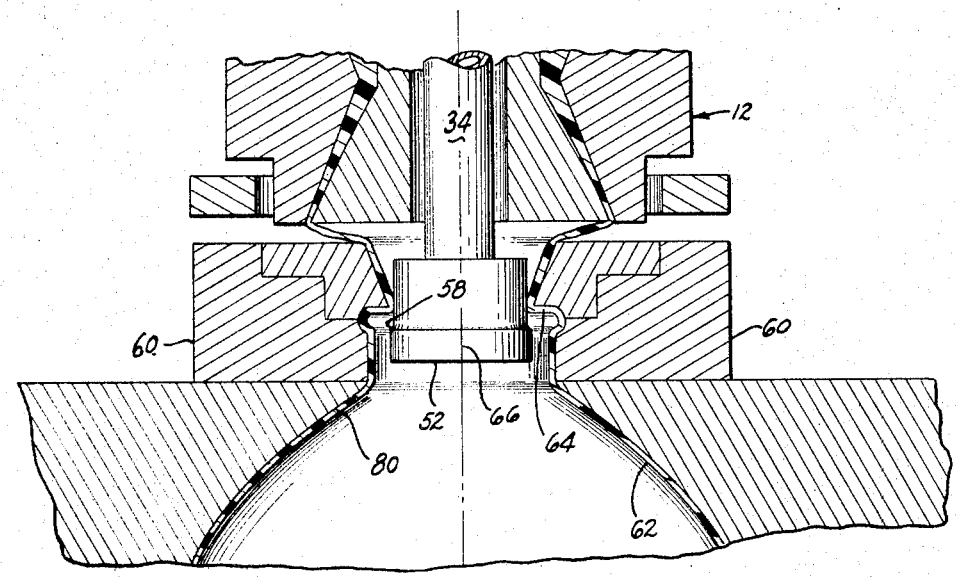
FIGURE 2 is an enlarged fragmentary sectional view, illustrated similarly to FIG. 1, showing the apparatus in the position thereof during blowing of a plastic container.
Figure 5:
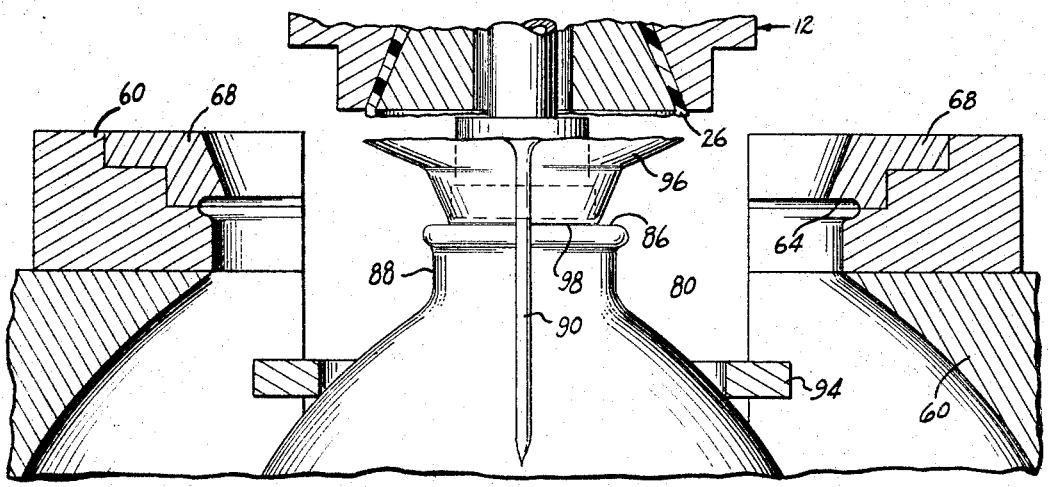
FIGURE 5 is a fragmentary sectional view like FIG. 4 showing the blow molded container in elevation and showing the stripper mechanism in a downwardly moved position to strip the blow molded container from the die head.

In the apparatus 10 of this invention, the position of the blow pin head portions 54 and 56 relative to the mold top wall 64 is important, for reasons which will more clearly appear hereinafter. As shown in FIGS. 1 and 2, during forming of the parison 28 and during expanding or blowing of the parison 28 into conformity with the mold cavity 62, the blow pin head 52 is in the "blow position" in which the smaller portion 54 thereof is horizontally aligned with the mold top wall 64 so that the shoulder 58 on the head 52 is below the mold top wall edge 70. As shown in FIGS. 3, 4 and 5, the blow pin head 52 is subsequently moved upwardly to a position in which the enlarged portion 56 thereof is horizontally aligned with the mold top wall 64 and the shoulder 58 on the head 52 is positioned above the mold top wall 64. This upper position of the blow pin head 52 is therefore sometimes hereinafter referred to as the "trim position" because the molded neck on the container is trimmed during movement of the blow pin head 52 to this position.

In the operation of the apparatus 10 of this invention, assume that the piston 36 in the hydraulic cylinder assembly 38 is in its lower position illustrated in FIG. 1 so that the shoulder 58 on the blow pin head 52 is below the plane of the mold top wall edge 70. Assume further that plastic has been forced through the die head discharge orifice 26 so as to form the tubular parison 28, and that the mold sections 60 have commenced moving from their spaced apart positions shown in FIGS. 1 and 4 toward closed positions. The mold sections 62 are subsequently moved to closed positions, as shown in FIG. 2, so as to define the mold cavity 62, and pinch and close the lower end of the parison 28 (not shown) as is conventional practice. Air is then supplied to the blow pin 34 through the flexible conduit 50 so as to expand or blow the parison 28 into conformity with the mold cavity 62 and form the plastic container 80, only the upper portion of which is illustrated in the drawing. Air is then exhausted from the mold cavity 62 through the blow pin 34, as is conventional practice and as is explained in the above-identified copending application, and fluid is supplied to the line 44 so as to move the piston 36 upwardly and move the blow pin head 52 to its trim position illustrated in FIGS. 3, 4 and 5.

As shown in FIG. 2, the diameter of the smaller blow pin head portion 54 is such that is cooperates with the plastic in the parison 28 to close the upper end of the mold cavity 62 during expansion of the parison 28 into conformity with the mold cavity 62. In other words the difference between the radius of head portion 54 and the radius of the shearing edge 70 is approximately equal to the thickness of the parison 28. As a result, during supply of blowing air to the interior of the parison 28, this air cannot escape around the blow pin head 52. In a preferred embodiment of the invention, the diameter of the blow pin head portion 52 is less than the diameter of the inner edge 70 of the mold cavity top wall 64 by only 0.010 inch. As a result, there is only 0.0005 inch clearance between the mold cavity edge 70 and the blow pin head portion 54 and this clearance space is occupied by plastic in the parison 28 so as to effectively plug the upper end of the mold cavity 62 during expansion of the parison 28 into conformity with the mold cavity 62.

The blow pin head portion 56 is of a diameter just enough less than the diameter of the edge 70 to allow it to move into the circular space bounded by edge 70. Consequently, head portion 56 can be defined as being of a diameter approximately equal to or slightly less than the diameter of edge 70. In a preferred embodiment of the invention, head portion 56 is of a diameter less than the diameter of the mold cavity edge 70 by only about 0.002 inch. As a result, there is a clearance between the head portion 56 and the cavity edge 70 of only about 0.001 inch during upward movement of the blow pin head 52. Consequently, during upward movement of the blow pin head 52, the edge 82, formed at the juncture of the shoulder 58 and the portion 56, functions as a shearing edge and cooperates with the shearing edge 70 on the mold sections 60 to effectively shear off the parison 28 at the inner edge 70 of the mold top wall 64. This shearing accomplishes a clean separation of the parison 28 at a position corresponding to the inner edge 84 of the radially inwardly extending lip 86 formed at the upper end of the neck 88 formed on the bottle 80 molded in the mold sections 60. As a result, no further trimming of the neck 88 is required on the container 80 in order to obtain a fully trimmed and finished container 80.

Figure 6:
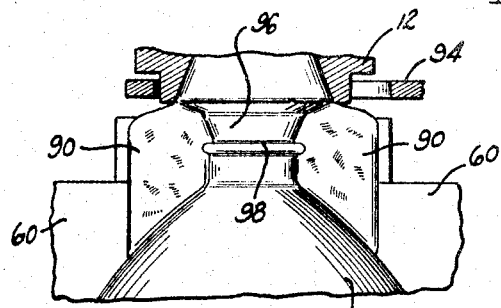
FIGURE 6 is a view similar to FIG. 5, but taken at 90° relative thereto showing the molded container prior to stripping.

At this time, however, the molded and trimmed container 80 is still attached to the heated plastic 24 in the die head 10 by the unused portion of parison 28 which forms flash, or excess material, indicated at 90 and 96 in FIGS. 5 and 6, the part 90 of which is formed as an incident to the movement of the mold sections 60 from their spaced-apart positions to their closed positions. Since the parison 28 is of a larger diameter than the upper end of the mold cavity 62, portions of the parison 28 are flattened between the surfaces 92 on the mold sections 60 which engage when the mold sections 60 are moved together. This flattened plastic subsequently cools and forms the flash 90.

Consequently, after the container 80 has been molded and trimmed in the apparatus 10, the mold sections 60 are subsequently moved apart as shown in FIG. 4 with the material indicated at 90 and 96 keeping the molded container 80 connected to the die head 10. During this movement of the mold sections 60 away from each other, there is a tendency for the molded bottle 80 to adhere to one or the other of the mold sections 60. However, as shown in FIG. 4, during such movement of the mold sections 60 away from each other, the portion 56 of the blow pin head 52 remains positioned within the upper end of the container 80. As a result, the blow pin head 52 effectively restrains the container 80 from moving with either of the mold sections 60. Once the mold sections 60 have been moved to fully spaced-apart positions, as shown in FIG. 5, a stripper bracket 94 normally positioned around the lower end of the die head 12 at a position above the discharge orifice 26, is moved downwardly, as shown in FIG. 5, into engagement with the side wall of the container 80 so as to force it downwardly and tear it away from the heated semi-fluid plastic 24 in the die head 12.

The resulting container 80 thus is encumbered with the flash 90 formed between the mold sections 60 and the additional flash 96 formed by the portion of the parison 28 which extended between the die head discharge orifice 26 and the mold top wall 64. All of this flash is separated from the container top lip 86 by a narrow space 98 resulting from the action of the shearing edges 70 and 82. At the edges of the portion of the mold cavity 62 in each section 60, the section 60 is formed with relatively sharp tight fitting edges which enable ready stripping of the flash 90, with the flash 96 connected thereto, from the container 80. After the container 80 has been stripped from the die head 12, as shown in FIG. 5, this flash 90 and 96 is sufficiently cool and rigid that it can at that time be readily manually or machine stripped from the container 80.

The cylinder assembly 38 is then actuated, by supplying fluid through the inlet line 42, so as to move the piston 36 downwardly to its position shown in FIG. 1. This downward movement of piston 36 accomplishes a return of the blow pin head 52 to its blow position shown in FIGS. 1 and 2 so that the blow pin 34 is in position for the next container molding operation. Either concurrently with or prior to this downward movement of the blow pin head 52, the extruder apparatus (not shown) connected to the die head 12 is operated to force plastic out the discharge orifice 26 so as to form another parison 28. The apparatus 10 is then in condition for repeating the above sequence of steps. This sequence is then continuously repeated to provide for the continuous molding and neck trimming of containers 80 with the apparatus 10.

From the above description it is seen that this invention provides apparatus 10 which is capable of providing neck trimmed blow molded plastic bottles without materially increasing the cost of the blow molding apparatus and without increasing the blow molding cycle time. By virtue of the cooperative action of the shearing edges 70 and 82 on the mold and the blow pin head, respectively, the upper end of the container neck is effectively trimmed so that no further trimming or finishing operations are required on the neck. The flash 90 and 96 remaining on the blow molded container 80 is readily broken off and the container 80 is then in condition for immediate filling, if desired, or storage for subsequent filling, without requiring any further operations on the container 80.

It will be understood that the apparatus for neck trimming blow molded plastic articles which is herein disclosed and described is presented for purposes of explanation and illustration and is not intended to indicate limits of the invention, the scope of which is defined by the following claims.

What is claimed is:

1. In apparatus for blow molding a container having an upper end neck, said apparatus comprising means for forming a downwardly extending parison having an open upper end, mold halves mounted for movement from positions on opposite sides of said parison to engaged positions in which said mold halves close the parison below the upper end thereof and define a mold cavity having an annular top wall which terminates in a radially inner edge, an upright hollow blow pin having a head of substantially cylindrical shape on the lower end thereof extended into said parison and into said mold cavity, means for moving said blow pin up and down so as to move said head between an elevated trim position and a lower blow position, and coacting means on said head and said top wall operable to sever said parison at the radially inner edge of said top wall in response to upward movement of said blow pin to move said head to said trim position.

2. In apparatus for blow molding a container having an upper end neck which terminates in a radially inwardly extending lip, said apparatus comprising means for forming a downwardly extending parison having an open upper end, mold halves mounted for movement from positions on opposite sides of said parison to engaged positions in which said mold halves close the parison below the upper end thereof and define a mold cavity having an annular top wall for forming said lip, an upright hollow blow pin having a head on the lower end thereof extended into said parison and into said mold cavity, said blow pin head being of substantially cylindrical shape and having an enlarged diameter lower end portion and a shoulder at the upper end of said portion, means for moving said blow pin up and down so as to move said head between a blow position in which said enlarged head portion is entirely below said cavity top wall and a trim position in which said shoulder is above said cavity top wall, said enlarged head portion being of a diameter approximately equal to the inner diameter of said annular top wall so that during upward travel of said head portion therethrough plastic in said parison above said top wall is separated from plastic in said cavity.

3. In blow molding apparatus, means forming a tubular parison of expandible plastic, a mold disposed about said parison and having a cavity terminating at one end in an annular wall disposed in a plane and having an axis, a blow pin for supplying air to said parison so as to expand it into conformity with said cavity, said blow pin having an axis substantially aligned with the axis of said annular wall and a coaxial head formed with a shoulder extending transversely of said axis and having an outer diameter substantially equal to the inner diameter of said annular wall and an inner diameter slightly less than the inner diameter of said annular wall, and means for moving said blow pin head so that said shoulder is moved through said plane in a direction from inside said cavity toward said one end thereof.

4. In blow molding apparatus, a die head having an annular discharge orifice for plastic in a heated semi-fluid condition, means forming a mold located adjacent said discharge orifice having a cavity terminating at one end in an annular wall disposed in a plane and having an axis, a blow pin for supplying air to said cavity, said blow pin having an axis substantially aligned with the axis of said annular wall and a head formed with a shoulder extending transversely of said axis and having an outer diameter substantially equal to the inner diameter of said annular wall and an inner diameter slightly less than the inner diameter of said annular wall, and means for moving said blow pin head so that said shoulder is moved through said plane in a direction from inside said cavity toward said one end thereof.

5. In apparatus for blow molding hollow plastic articles from thermoplastic tubing, the combination of an axially reciprocable blow pin for movement between an advanced blow position and a retracted trim position, said blow pin having an enlarged head portion adapted to be located in one end of a length of thermoplastic tubing, a partible mold forming when closed a cavity defining an article to be molded, one end wall of said cavity having an opening on the parting line of the mold through which the head portion of said blow pin can be retracted, means operable when said blow pin is in its blow position for closing said partible mold about a length of thermoplastic tubing extending from said blow pin and about said blow pin so that said head portion is confined within said cavity, means for introducing fluid through said blow pin for blowing said tubing to the shape of said cavity, said head portion and the portion of the end wall defining said opening having cooperating edges for trimming the portion of said tubing on said blow pin exterior of said cavity from the blown article in said cavity when said blow pin is moved to its retracted trim position, and means for moving said blow pin to its retracted position.

6. In apparatus for concurrently blow molding and trimming the upper open end of a container, means forming a downwardly extending parison, a blow pin extending downwardly into said parison and having an enlarged head on the lower end thereof, means forming a mold cavity of a shape corresponding to the desired final shape of said container around said parison at a position such that the open upper end of said container is located above at least a portion of said head, means for supplying a blowing fluid to said parison through said blow pin head, means on said head cooperable with said parison and said mold cavity forming means to close the upper end of said mold cavity during supply of blowing fluid to said blow pin, means for moving said blow pin upwardly so as to move said head portion upwardly relative to said mold cavity forming means, said head portion and said mold cavity forming means being relatively proportioned to provide for a separation of the plastic in said mold cavity from the plastic above said cavity by said head portion in response to said movement.

7. In apparatus for concurrently blow molding and trimming the open upper end of a plastic container, a vertically extending die head having an annular passage for heated plastic in a semi-fluid condition terminating in a downwardly opening annular discharge orifice, means forming a vertically extending opening in said die head which is substantially coaxial with said orifice and has a side wall, a hollow vertically extending blow pin extending through said die head opening in a clearance relation with said side wall, piston and cylinder means located above said die head and connected to the upper end of said blow pin for moving said blow pin up and down in said opening, means for supplying fluid to the interior of said blow pin, mold means located below and in a closely spaced relation with said discharge orifice forming a mold cavity having an annular top wall which terminates at the radially inner edge thereof in a shearing edge, and means on the lower end of said blow pin forming a circular shearing edge which is substantially coaxial with said shearing edge on said mold cavity top wall, said piston and cylinder means being operable to move said shearing edge past and into close proximity to said top wall shearing edge so as to shear material disposed therebetween.

8. In apparatus for concurrently blow molding and trimming the open upper end of a plastic container, a vertically extending die head having an annular passage for heated plastic in a semi-fluid condition terminating in a downwardly opening annular discharge orifice, means forming a vertically extending opening in said die head which is substantially coaxial with said orifice and has a side wall, a hollow vertically extending blow pin extending through said die head opening in a clearance relation with said side wall, piston and cylinder means located above said die head and connected to the upper end of said blow pin for moving said blow pin up and down in said opening, means for supplying fluid to the interior of said blow pin, mold means located below and in a closely spaced relation with said discharge orifice forming a mold cavity having an annular top wall which terminates at the radially inner edge thereof in a shearing edge, means on the lower end of said blow pin forming a circular shearing edge which is substantially coaxial with said shearing edge on said mold cavity top wall, said blow pin being of an enlarged cylindrical shape above said shoulder and of a diameter less than the diameter of said shearing edges, said piston and cylinder means being operable to move said shearing edge upwardly past said top wall shearing edge so as to shear material disposed therebetween.

9. In apparatus for concurrently blow molding and trimming the open upper end of a plastic container, a vertically extending die head having an annular passage for heated plastic in a semi-fluid condition terminating in a downwardly opening annular discharge orifice from which a tubular parison of expandible plastic depends, means forming a vertically extending opening in said die head which is substantially coaxial with said orifice and has a side wall, a hollow vertically extending blow pin extending through said die head opening in a clearance relation with said side wall, piston and cylinder means located above said die head and connected to the upper end of said blow pin for moving said blow pin up and down in said opening, means for supplying fluid to the interior of said blow pin, a plurality of mold members located below and in a closely spaced relation with said discharge orifice and movable from spaced positions on opposite sides of said parison to engaged positions pinching said parison therebetween and forming a mold cavity around said parison having an annular top wall which terminates at the radially inner edge thereof in a shearing edge, means on the lower end of said blow pin forming a circular shearing edge which is substantially coaxial with said shearing edge on said mold cavity top wall and is disposed therebelow, said piston and cylinder means being operable to move said shearing edge upwardly past and into close proximity to said top wall shearing edge so as to shear the portion of said parison disposed therebetween to a predetermined stop position of said blow pin, and cylinder shape means on said blow pin below said shearing edge thereon disposed concentrically within and in a closely spaced relation with said cavity top wall shearing edge.

References Cited

UNITED STATES PATENTS

| | | | |
|---|---|---|---|
| 3,025,562 | 3/1962 | Nelson | 18—5 |
| 3,272,896 | 9/1966 | Winchester | 18—5 X |
| 3,314,106 | 4/1967 | Latreille et al. | 18—5 |

WILBUR L. McBAY, *Primary Examiner.*